US011353613B2

United States Patent
Wang et al.

(10) Patent No.: US 11,353,613 B2
(45) Date of Patent: Jun. 7, 2022

(54) SEISMIC EXPLORATION USING IMAGE-BASED REFLECTION FULL WAVEFORM INVERSION TO UPDATE LOW WAVENUMBER VELOCITY MODEL

(71) Applicant: CGG SERVICES SAS, Massy (FR)

(72) Inventors: Min Wang, Singapore (SG); Yi Xie, Singapore (SG); Xiaodong Wu, Singapore (SG); Dechun Lin, Singapore (SG)

(73) Assignee: CGG SERVICES SAS, Massy (FR)

( * ) Notice: Subject to any disclaimer, the term of this patent is extended or adjusted under 35 U.S.C. 154(b) by 458 days.

(21) Appl. No.: 16/191,539

(22) Filed: Nov. 15, 2018

(65) Prior Publication Data
US 2019/0154857 A1    May 23, 2019

Related U.S. Application Data

(60) Provisional application No. 62/587,552, filed on Nov. 17, 2017.

(51) Int. Cl.
*G01V 1/38* (2006.01)
*G01V 1/28* (2006.01)
*G01V 1/30* (2006.01)

(52) U.S. Cl.
CPC .......... *G01V 1/3808* (2013.01); *G01V 1/282* (2013.01); *G01V 1/303* (2013.01); *G01V 2210/512* (2013.01); *G01V 2210/67* (2013.01)

(58) Field of Classification Search
CPC ...... G01V 1/3808; G01V 1/282; G01V 1/303; G01V 2210/512; G01V 2210/67
See application file for complete search history.

(56) References Cited

U.S. PATENT DOCUMENTS

| 2013/0238249 A1* | 9/2013 | Xu | G01V 1/3808 |
| | | | 702/18 |
| 2014/0321713 A1* | 10/2014 | Sava | G01V 1/303 |
| | | | 382/109 |

(Continued)

FOREIGN PATENT DOCUMENTS

WO    WO-2016154404 A1 *  9/2016  ............. G01V 1/364

OTHER PUBLICATIONS

J. Schleicher, J. C. Costa, and A. Novais, Time Migration Velocity Analysis by Image-Wave Propagation of Common-Image Gather, 2008, Annual WIT report 2008 (Year: 2008).*

(Continued)

*Primary Examiner* — Isam A Alsomiri
*Assistant Examiner* — Abdallah Abulaban
(74) *Attorney, Agent, or Firm* — Patent Portfolio Builders PLLC

(57) ABSTRACT

A seismic exploration method includes performing a true amplitude PSDM based on an initial velocity model of a subsurface formation to obtain a reflectivity model, and then a Born modeling using the reflectivity model to generate synthetic data. An image-based reflection full waveform inversion is applied to a cost function of differences between seismic data acquired over the subsurface formation and the synthetic data to update the initial velocity model. The updated velocity model enables exploring the presence of and/or assisting in the extraction of natural resources from the subsurface formation.

19 Claims, 9 Drawing Sheets

(56) References Cited

U.S. PATENT DOCUMENTS

2016/0238722 A1* 8/2016 Vdovina ............... G01V 1/368
2017/0131418 A1 5/2017 Wang et al.

OTHER PUBLICATIONS

Dong Sun et al., "Reflection based Waveform Inversion", SEG International Exposition and 86th Annual Meeting, Oct. 16-21, 2016, Dallas, Texas, pp. 1151-1156.

J. Ramos-Martinez et al., "A Robust Gradient for Long Wavelength FWI Updates", 78th EAGE Conference & Exhibition, May 30-Jun. 2, 2016, Vienna, Austria.

Kenneth Irabor et al., "Reflection FWI", Seg International Exposition and 86th Annual Meeting, Oct. 16-21, 2016, Dallas, Texas, pp. 1136-1140.

M. Wang et al., Dynamic-warping full-waveform inversion to overcome cycle skipping, SEG International Exposition and 86th Annual Meeting, Oct. 16-21, 2016, Dallas, Texas, pp. 1273-1277.

Michael Warner et al., "Adaptive waveform inversion: Theory", Geophysics, Nov.-Dec. 2016, pp. R429-R445, vol. 81, No. 6.

N. Chazalnoel et al., "Revealing Shallow and Deep Complex Geological Features with FWI—Lessons Learned", 79th EAGE Conference & Exhibition, Jun. 12-15, 2017, Paris, France.

Peter Mora, "Inversion = migration + tomography", Geophysics, Dec. 1989, pp. 1575-1586, vol. 54, No. 12.

Peter Whiting et al., "Prestack Kirchhoff migration and amplitude accuracy", ASEG 15th Geophysical Conference and Exhibition, Aug. 2001, Brisbane, Australia.

Q. Guo et al., "Velocity Building by Reflection Waveform Inversion without Cycle-skipping", 79th EAGE Conference & Exhibition, Jun. 12-15, 2017, Paris, France.

Qiang Guo et al., "Elastic reflection-based waveform inversion with a nonlinear approach", Geophysics, Nov.-Dec. 2017, pp. R309-R321, vol. 82, No. 6.

Samuel H. Gray et al., "True-amplitude Gaussian-beam migration", Geophysics, Mar.-Apr. 2009, pp. S11-S23, vol. 74, No. 2.

Sheng Xu et al., "Inversion on Reflected Seismic Wave", SEG Las Vegas 2012 Annual Meeting, Nov. 4-9, 2012, Las Vegas, Nevada, pp. 1-7.

Tariq Alkhalifah et al., "The natural combination of full and image-based waveform inversion", Geophysical Prospecting, 2015, pp. 1-12.

V.V Kazei et al., "Efficient Deflection Angle Based Filtering for Waveform Inversion", 7th Saint Petersburg International Conference & Exhibition, Apr. 11-14, 2016, Saint Petersburg, Russia.

Yaxun TANG et al., "Tomographically enhanced full wavefield inversion", SEG Houston 2013 Annual Meeting, Sep. 22-27, 2013, Houston, Texas, pp. 1037-1041.

Yu ZHANG et al., "True-amplitude, angle-domain, common-image gathers from one-way wave-equation migrations", Geophysics, Jan.-Feb. 2007, pp. S49-S58, vol. 72, No. 1.

Yu Zhang et al., "Velocity and impedance inversion based on true amplitude Reverse Time Migration", SEG Houston 2013 Annual Meeting, Sep. 22-27, 2013, Houston, Texas, pp. 949-953.

* cited by examiner

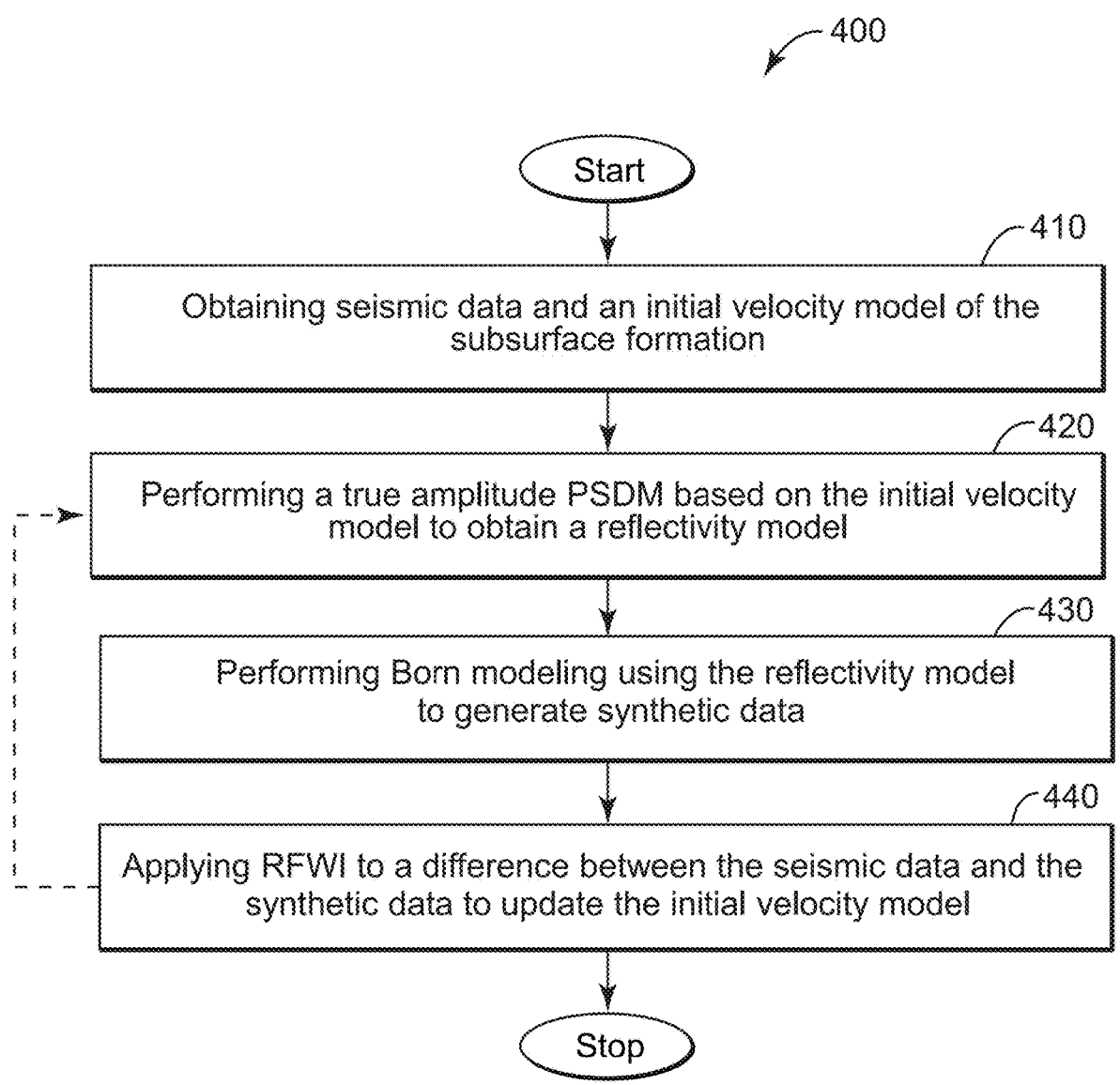

SEISMIC EXPLORATION USING IMAGE-BASED REFLECTION FULL WAVEFORM INVERSION TO UPDATE LOW WAVENUMBER VELOCITY MODEL

CROSS REFERENCE TO RELATED APPLICATION

This application claims priority and benefit from U.S. Provisional Patent Application No. 62/587,552 filed on Nov. 17, 2017, for "Image-based reflection FWI for low wavenumber velocity update" the entire contents of which is incorporated in its entirety herein by reference.

BACKGROUND

Technical Field

Embodiments of the subject matter disclosed herein generally relate to methods and systems for seismic exploration of underground structures and, more particularly, to mechanisms and techniques for assessing an underground structure with a velocity model whose low wavenumber component is updated using image-based reflection full waveform inversion.

Discussion of the Background

Seismic exploration encompasses seismic data acquisition and seismic data processing techniques for generating a profile (image) of an explored underground geophysical formation (which is more simply called the subsurface). This profile is a three-dimensional approximation of the subsurface that enables those trained in the field to evaluate the presence or absence of natural resources, including, among others, oil and/or gas, in the subsurface. Enhancing the image of the explored subsurface is desirable for locating sought-after natural resources, designing exploitation plans and monitoring the exploitation thereof.

FIG. 1 is a vertical-plane view of a generic marine survey setup 100. A vessel 101 tows a seismic source 102 and streamers (only one streamer 104 is visible in this vertical view, although nowadays streamer spreads extending in a horizontal plane are more often used) carrying sensors 106, in a towing direction T. A sensor is a physical device that detects incoming seismic excitations and generates seismic data. Although a single source is shown in FIG. 1, plural sources may be used. The source(s) may be an array of individual elements such as air-guns. The sources may be impulsive (e.g., air-guns) or non-impulsive (e.g., vibrators).

The seismic source emits seismic excitation 108 which travels through the water layer and then penetrates the geological formation under the seafloor 110. The seismic excitation is partially reflected and partially transmitted at interfaces where the acoustic impedance changes, such as at the seafloor 110 and at an interface 112 inside the geological formation. Reflected excitation 114 may be detected by sensors 106. Seismic data includes series of samples of the detected excitations and corresponding sampling times (which series are called traces). A sensor may be a hydrophone, geophone and/or accelerometer. The acquired or recorded seismic dataset represents the detected energy.

Recorded traces are processed to image the subsurface, e.g., to locate the interfaces where impedance changes and therefore the seismic excitation's traveling path changes direction. The impedance is a product of the propagation velocity and density and, thus, depends on the nature of the subsurface layer. Seismic data processing often builds a velocity model of the subsurface delimiting the layers associated with certain propagation velocities. Full waveform inversion (FWI) is a technique used to generate high-quality velocity models. Customary available computer resources as well as the data acquired by nowadays seismic acquisition systems are insufficient to perform complete un-approximated full waveform inversions of seismic data. Therefore, techniques approximating FWI have been developed to obtain velocity models with high-enough resolution and fidelity.

FWI is considered the most reliable tool to build accurate velocity models. Many successful examples have demonstrated that FWI using diving waves provides high-fidelity velocity, while it is limited for shallow layers due to the penetration of diving waves within available cable length. Reflected waves would be naturally used to extend the reach of FWI to deep sections. However, the reflection energy based FWI's (RFWI's) success highly relies on the contents of low frequencies in recorded reflections. In most cases, the velocity model update in standard FWI is dominated by high wavenumber components called the "migration term". The migration term not only may be cross-talked with density, elastic and other effects, but also has limited impact on imaging. An accurate low wavenumber velocity model is of the essence in obtaining a high-fidelity seismic image and, thus, a reliable structural characterization. The accuracy of the low wavenumber velocity model also directly affects the success of high wavenumber velocity model updates. The manner of obtaining the low wavenumber velocity components of the model (called the "tomography term") is a challenge of RFWI.

Conventional RFWI has not been very successful in obtaining a good tomography term to build on an accurate migration term. Thus, there is a need for new methods and devices achieving improved low wavenumber velocity components.

SUMMARY

According to an embodiment, there is a method for seismic exploration that includes obtaining seismic data acquired using at least one source and sensors over a subsurface formation and an initial velocity model of the subsurface formation, performing a true amplitude pre-stack depth migration based on the initial velocity model to obtain a reflectivity model, performing Born modeling using the reflectivity model to generate synthetic data, and applying image-based reflection full waveform inversion to a difference between the seismic data and the synthetic data to update the initial velocity model. The updated velocity model is used to explore the presence of and/or assist extraction of natural resources from the subsurface formation.

According to another embodiment, there is a seismic data processing apparatus with an interface configured to obtain seismic data acquired over a subsurface formation and an initial velocity model of the subsurface formation, and a data processing unit connected to the interface and including at least one processor. The data processing unit is configured to perform a true amplitude pre-stack depth migration based on the initial velocity model to obtain a reflectivity model; to perform—Born modeling using the reflectivity model to generate synthetic data, and to apply image-based reflection full waveform inversion to a difference between the seismic data and the synthetic data to update the initial velocity model.

According to yet another embodiment, there is a non-transitory computer readable medium storing executable codes which, when executed on a computer make the computer perform a seismic exploration method. The method includes obtaining seismic data acquired using at least one source and sensors over a subsurface formation and an initial velocity model of the subsurface formation, performing a true amplitude pre-stack depth migration based on the initial velocity model to obtain a reflectivity model, performing Born modeling using the reflectivity model to generate synthetic data, and applying image-based reflection full waveform inversion to a difference between the seismic data and the synthetic data to update the initial velocity model. The updated velocity model is used to explore presence and/or assist extraction of natural resources from the subsurface formation.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 4 is a schematic diagram of a method incorporating the previously described techniques according to an embodiment;

DETAILED DESCRIPTION

Figure 1:
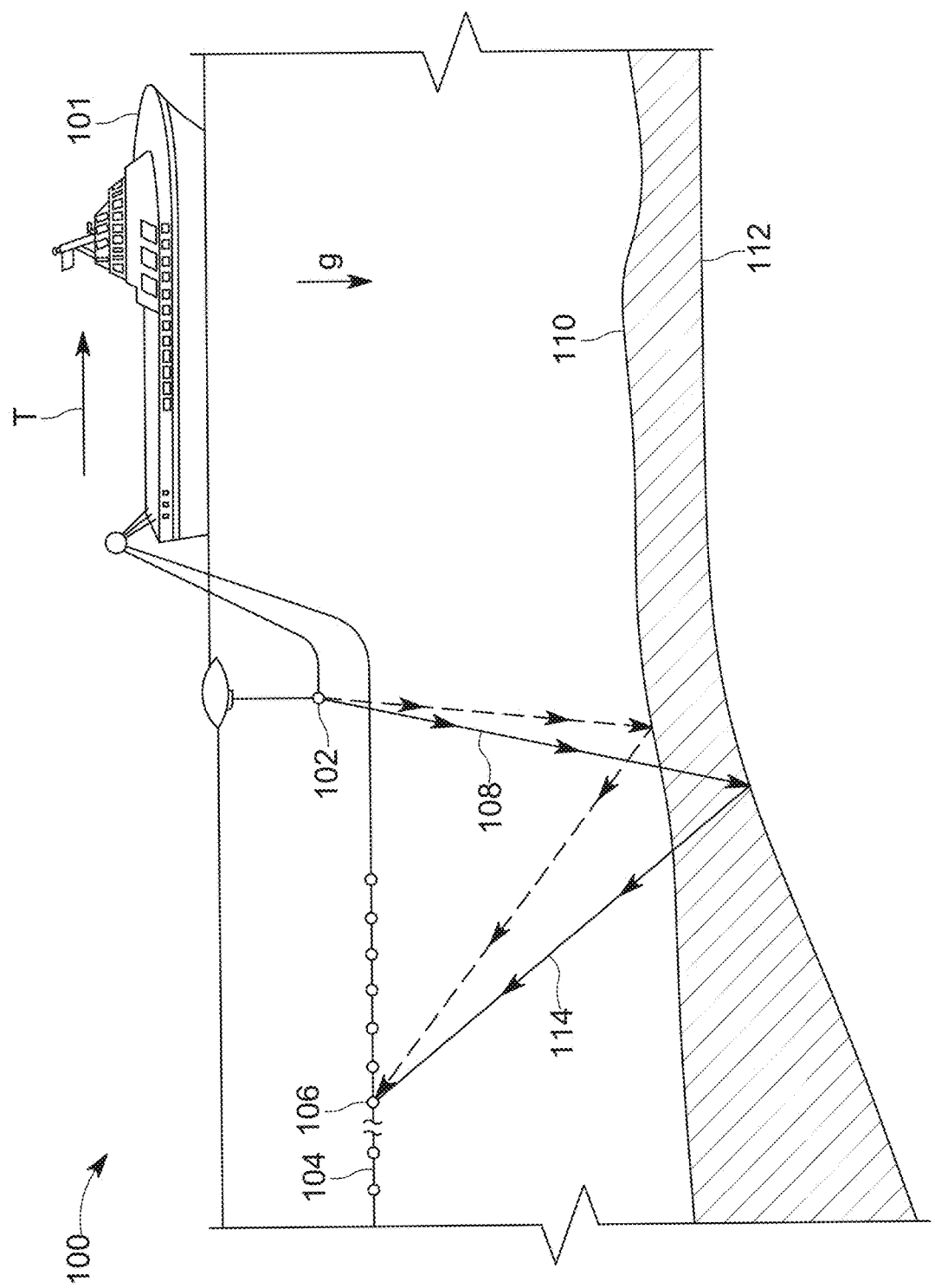
FIG. 1 illustrates a generic marine seismic survey system.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed without specifying whether seismic data has been acquired on land or in a marine environment as the disclosed embodiments operate in both cases.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments described in this section, image-based RFWI (IB-RFWI) is used to achieve improved low wavenumber velocity components of the velocity model of a surveyed subsurface. As already mentioned, conventional RFWI efficiently updates the high wavenumber components of the velocity model if sufficiently low frequencies are not available in the seismic data, but this migration term has limited impact on imaging. IB-RFWI uses Born modeling with images to produce the tomography term (i.e., to update the low wavenumber components of the velocity model). The kinematics differences are used to calculate data versus model misfit to minimize the effects of density leakage, as well as other amplitude effects which are hard to model with an acoustic wave propagator. Two different approaches, kinematics extraction and data spectrum matching between the observed and the modeled data, are used to achieve a more reliable update of the velocity model. The kinematics extraction approach can be performed in the image domain or in the data domain. Kinematics extraction excludes amplitude information and uses phase information. Dynamic warping and local cross-correlation analysis are two approaches to kinematic extraction or RMO correction. Data spectrum matching use amplitude information.

A brief overview of some phenomenological aspects and mathematical formulation of RFWI is provided before describing various embodiments. In full wave propagation, reflections would be generated by sharp boundaries, either from velocity or density contrast. This sharpness is difficult to obtain when starting with a smoothly varying velocity/density model. An efficient manner for recovering the sharp contrasts, even if starting with the smoothly varying velocity model, is using Born modeling to generate reflections from reflectivity/images.

Some RFWI techniques separate tomography and migration terms from a conventional gradient by wave decomposition. The separated terms can be recombined with different weights as described, for example, in the article, "Tomography enhanced full wavefield inversion," by Tang, Y., et al. published in *SEG Technical Program Expanded Abstracts* 2013, pp. 1037-1041, which is incorporated herewith by reference in its entirety. Alternatively, the separated terms can be used in two stages as described, for example, in the articles, "Reflection FWI," by Irabor, K., et al. published in *SEG Technical Program Expanded Abstracts* 2016, pp. 1136-1140, and "Revealing shallow and deep complex geological features with RFWI: lessons learned," by Chazalnoel, N., et al. published in *EAGE Extended Abstracts* 2017, We A3 02, which are both incorporated herewith by reference in their entirety.

Separation of the different components relies on up- and down-going wave decomposition, which is challenging for complex waves around high-contrast reflectors or rugose boundaries. Another approach assumes the reflections can be generated by Born modeling using the background model and the corresponding images. Low wavenumber velocity components are then updated by introducing Born modeling into a standard FWI kernel as described, for example, in the articles, "Inversion on Reflected Seismic Wave," by Xu, S., et al. published in *SEG Technical Program Expanded Abstracts* 2012, pp. 1-7, and "Reflection based waveform inversion," by Sun D. published in *SEG Technical Program Expanded Abstracts* 2016, pp. 1151-1156. In Xu's approach, the velocity model is split into a background model $m_0$, which contains the long wavelength components, and a perturbation of the background model $\delta_m$, which contains the short wavelength components. The background velocity model governs the kinematics, and the perturbation mainly affects the dynamics of the wave-field. Accordingly, the Green's function G can be expressed as a sum of a background wave-field $G_0$ and a perturbed wave-field $\delta G$. A cross-correlation cost function C is used in Xu's approach for the inversion process. The corresponding gradient of background velocity update is obtained by Fréchet derivative analysis as mathematically expressed in the following equation:

$$\left.\frac{\partial C}{\partial m_0}\right|_{\delta m} = \int\int ds dr \int d\omega \left.\frac{\partial \delta G}{\partial m_0}\right|_{\delta m}^* G_{obs} \quad (1)$$

where * denotes the conjugated, and s and r are the source and receiver positions. Perturbed wave-field δG can be obtained by Born modeling of the true amplitude depth-migrated image. $G_{obs}$ is the observed wave-field (based on acquired seismic data). The cross-correlation-based cost function in the frequency domain measures the overall similarity within the entire time, which may be dominated by the strongest events.

In the following embodiments, the RFWI approach is rendered more practical and robust by the following features. The cost function measures the waveform difference between acquired seismic data and simulated/calculated seismic data generated using the velocity model. Waveform difference indicates that the difference between observed (acquired) and synthetic (simulated/calculated/modelled) seismic data contains both amplitude and phase information. Since IB-RFWI is waveform-based, it uses both phase and amplitude information; hence, the inversion is robust to noise because the relative amplitude information operates as a type of weighting.

The approach used to generate modeled reflection data is not limited to two-way wave propagation, which is prohibitively expensive in generating gathers, but can instead use a more cost-effective Kirchhoff migration and demigration engine.

Using kinematic extraction minimizes amplitude effects while also alleviating the waveform stretch and the difficulty of matching model data when there are holes in the acquired data due to un-modeled phenomena, like diffraction. The kinematics extraction or data matching used in the inversion flow reduces the kinematics error in data misfit, thereby yielding a more reliable inversion. The kinematic extraction may be performed in the image domain or in the data domain.

If kinematic extraction is performed in the image domain, demigration is applied to the residual move-out (RMO) corrected images to maximize the similarity between the calculated/simulated data (based on the velocity model and the RMO corrected image) and the observed (i.e., acquired) seismic data of the same offset. RMO correction can be done by different methods, such as dynamic warping or local cross-correlation analysis. Alternatively, the differences (image residuals) between the original images and the RMO-corrected images are calculated, and then the image residuals are demigrated to the data domain.

If kinematic extraction is performed in the data domain, methods such as dynamic warping or local cross-correlation analysis may be used to detect the phase difference between the observed and calculated data. Using the phase difference, either the observed data can be warped to act as new synthetic data, or the synthetic data can be warped to act as new observed data. Either way, the new pair of simulated and observed data has the same amplitude while the phase difference remains unchanged. In yet another embodiment, data spectrum-matching may be used to reduce the amplitude difference between the observed and the modeled data.

Figure 2:
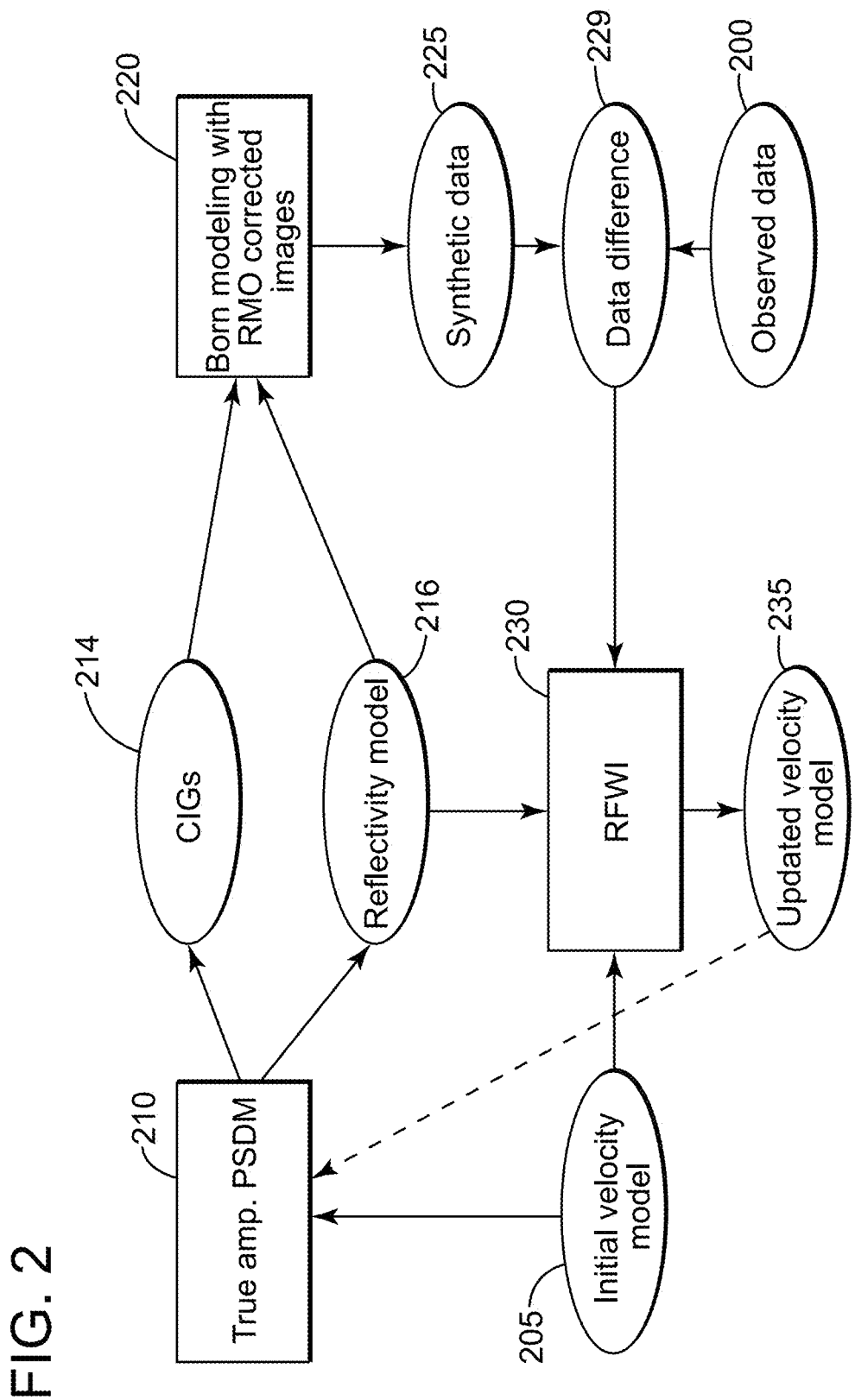
FIG. 2 is a flowchart illustrating an IB-RFWI technique according to an embodiment.

A flowchart of the IB-RFWI according to an embodiment is illustrated in FIG. 2. The cost function C of RFWI kernel 230 is the waveform difference (i.e., data residuals) between the observed data $G_{obs}$ and calculated data $G_{cal}$ (i.e., simulating the observed data using the current velocity model). The gradient of low wavenumber velocity model is obtained as:

$$\left.\frac{\partial C}{\partial m_0}\right|_{\delta m} = \int\int ds dr \int d\omega \left.\frac{\partial \delta G}{\partial m_0}\right|_{\delta m}^* (G_{obs} - G_{cal}) \quad (2)$$

Equation (2) is formulated in the frequency domain as equation (1) to ease their comparison. However, the actual implementation is done in the time domain because it is more efficient for large-scale case study. Furthermore, implementation in the time domain via data residuals provides the flexibility to balance the relative amplitude between different events. Different from conventional FWI, one side of full wave propagation is replaced by Born modeling. This approach can also be understood in the realm of physical reality as a correlation of one side reflected up-going wave-field and the other side down-going wave-field. In a graph representing source-reflector-receiver contribution to a seismic reflection full waveform inversion as in equation (2), a "rabbit ears" pattern is naturally generated without distortions caused by up-/down-going wave-field decomposition when separating the tomography term.

The interference of density, absorption or elastic effects which mainly causes amplitude/spectrum difference needs to be mitigated for a reliable inversion. Kinematics extraction or data matching are employed to alleviate wavelet stretch and difficulty encountered in matching simulated data in which some phenomena like diffraction are not modeled.

The flowchart in FIG. 2 embodies detecting depth error of reflectors in the image domain and then converting to kinematics error in the data domain by demigration. Then the data difference is fed into an RFWI kernel to update low wavenumber components of the velocity model. The overall approach of IB-RFWI aims to maximize both the similarity between the observed and the modeled data, and imaging gather flatness. The rectangles in FIG. 2 represent the three main steps of this IB-RFWI technique. The oval shapes represent data input and output for each process.

At 210, a true amplitude pre-stack depth migration (PSDM) is applied to the initial velocity model 205 to form the Common Image Gathers (CIGs) 214 and a reflectivity model 216. True-amplitude depth migration provides not only a focused structural image, but also information on the strength of the reflectors and the reflectivity model. True amplitude depth migration has less amplitude difference between observed and modelled synthetic data, thus generating better matching between observed and modelled synthetic data. Suitable methods of true amplitude PSDM include, for example, Kirchhoff true amplitude PSDM (described, e.g., by P. Whiting et al. in 2001 article entitled "Prestack Kirchhoff migration and amplitude accuracy," published as an Extended Abstract, ASEG 2001, Brisbane, pp. 1-4), one-way wave-equation true amplitude PSDM (described, e.g., by Y. Zhang et al. in 2007 article entitled "True-amplitude, angle-domain, common-image gathers from one-way wave-equation migrations," published in Geophysics 72, No. 1, pp. S49-S58), controlled beam migration (CBM) true amplitude PSDM (described, e.g., by S. Gray et al. in 2009 article entitled "True-amplitude Gaussian-beam migration," published in Geophysics 74, No. 2, S11-S23), and RTM true amplitude PSDM (described, e.g., by Y. Zhang et al. in 2013 article entitled "Velocity and impedance inversion based true amplitude reverse time migration" published as an Extended Abstract, in SEG 2013, pp. 949-953). All the papers mentioned in this paragraph are incorporated herewith by reference in their entirety.

The reflectivity model 216 is used for RFWI kernel 230 and for RMO correction. A full-offset stack section is the reference (reflectivity model) for general cases, while selected offset stacks are employed for complex structures. Offset is specified as the distance between source and receiver; x axis (also termed inline distance) and z axis (also termed depth) are both spatial directions.

At 220, a Born modeling is performed with RMO-corrected images. When the velocity model is not accurate, the events in CIGs are not aligned across offsets. RMO correction (e.g., dynamic warping, local cross-correlation calculation, etc.) causes the CIG events to become aligned across offsets, absent offset-dependent depth errors of the images. Applying Born modeling to such an RMO-corrected image converts the depth error to a kinematics error between the simulated reflection data and the observed/acquired data, while their amplitudes are maintained close to one another. Thus, the output of step 220 is synthetic (i.e., simulated/calculated) data 225. Alternatively, the image difference can be calculated from the original and RMO-corrected images, and then demigrated into the data domain by Born modeling. Thus, the output is the data differences (229) which can then be directly used for RFWI. FIG. 2 illustrates kinematic extraction via RMO-correction (220), producing data differences (229) which have very close amplitude while having a phase difference between the observed 220 and synthetic data 225.

Data difference 229 between the synthetic data 225 and observed data 200 (i.e., the acquired seismic data) is input to the RFWI kernel at 230 together with the initial velocity model 205 and reflectivity model 216. The kinematics-dominated misfit 229 fed into the RFWI yields an updated velocity model. The RFWI kernel incorporates Born modeling in either source-side forward modeling or receiver-side backward modeling to generate reflection waves as in equation (2). This process can be iterated until the velocity model satisfies a predetermined suitability criterion (e.g., convergence, stability, calculated vs observed data matching, etc.).

To summarize, the objective of IB-RFWI technique illustrated in FIG. 2 is to update the velocity model so as to guarantee flatness of events in CIGs and also to minimize differences between the calculated and observed data.

Figure 3:
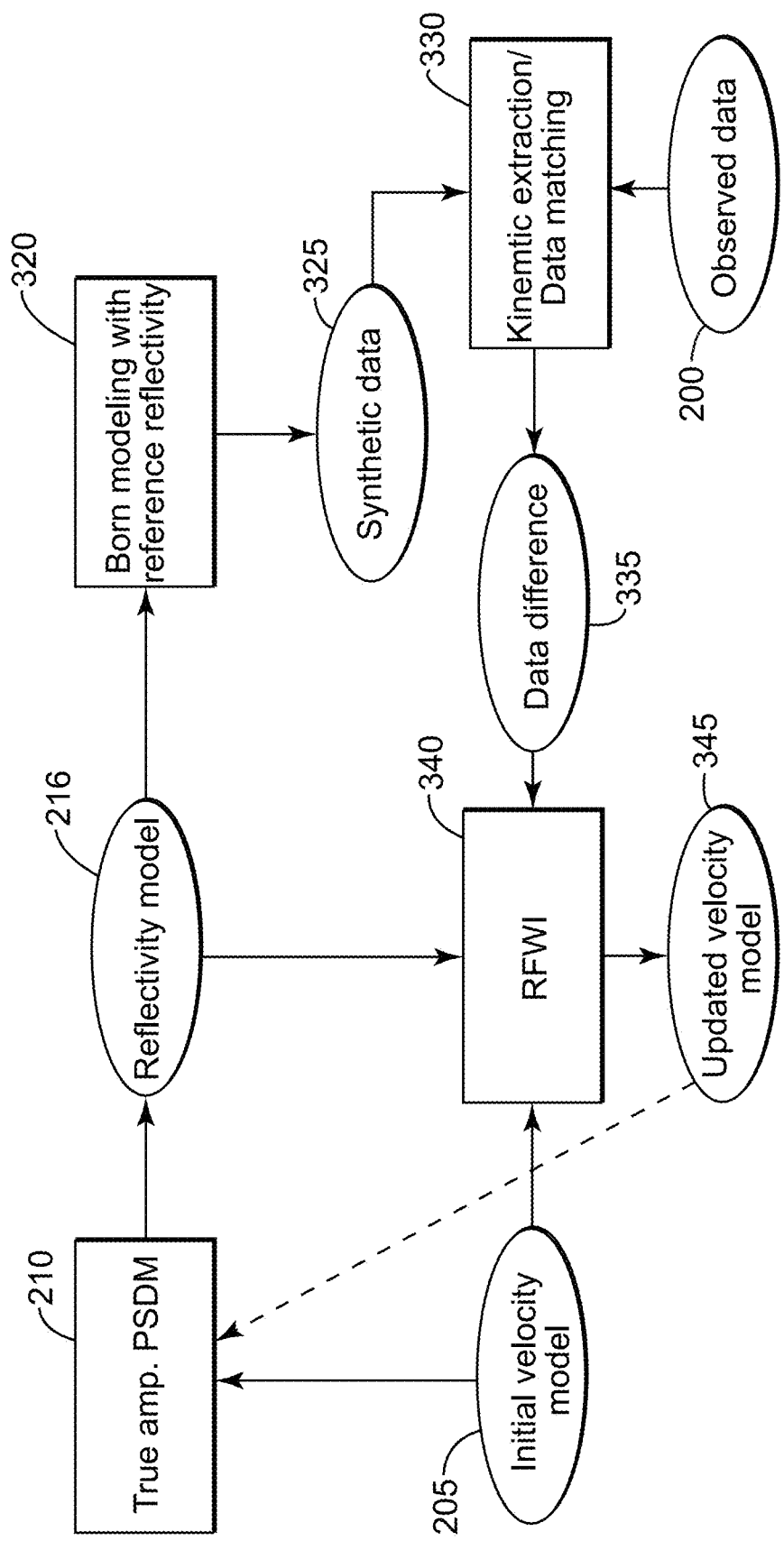
FIG. 3 is a flowchart illustrating an IB-RFWI technique according to another embodiment.

FIG. 3 illustrates a flowchart of another IB-RFWI technique according to another embodiment. The kinematics difference or data spectrum matching in the data domain of this technique is a better approach, especially when the CIGs are not suitable for RMO process, or when the initial velocity is too different from reality to provide focused events. Different from the flowchart in FIG. 2, in this flowchart, the synthetic data 325 is generated by Born modeling using reference reflectivity 216. The synthetic data thus generated has an amplitude/spectrum difference, or even has extra or missing events compared with the observed data. A method such as dynamic warping or local cross-correlation analysis is used to detect the phase differences between the synthetic data 325 and the observed data 200. At 330, those phase differences are applied to the observed data to turn it into phase-shifted observed data, or to the modeled data to be phase-shifted model data. The new pair of simulated and observed data is then used for final data misfit 335 calculation so as to use the kinematics difference for the velocity-model-updating inversion. In an alternative embodiment, at 330, data spectrum (including amplitude) matching between the synthetic and observed data is used to reduce the impact of amplitude error, while the phase difference is maintained. At 340, the RFWI yields an updated velocity model 345. RFWI 340 uses the same kernel as RFWI 230. In the IB-RFWI technique illustrated in FIG. 3, the true amplitude PSDM 210 yields stacked images (reflectivity model 216), and the Born modeling 320 uses the stacked images to generate the synthetic data. When there are density or other effects which cannot be modelled, it is advantageous to perform the dynamic warping or local cross-correlation analysis to extract the phase differences between the synthetic data and the observed data. The new pair of simulated and observed data has the same amplitude while the phase difference remains unchanged. In FIG. 3, when kinematic extraction is performed at 330 after Born modeling with stacked images (reference reflectivity), phase differences are used to generate a new pair of datasets, yielding the data difference 335.

The RFWI performs a nonlinear inversion for velocity update. The steps in the flowcharts are repeated (this iterative aspect is suggested by the dashed lines in FIGS. 2 and 3). The first iteration yields an approximate location of the reflectors, and subsequent iterations update both velocity and reflector locations.

The IB-RFWI has similarities with tomography. However, the fidelity of ray-based tomography depends highly on event-picking, which is a difficult and tedious task, especially for noisy data. In contrast, IB-RFWI doesn't need event-picking, while the wave equation-based nature of this approach allows imaging complex areas with strong velocity variations and produces high-resolution velocity models. This accuracy is of critical importance for imaging underneath a complex overburden, such as a gas cloud, a channel, and faults. The IB-RFWI-based model-building flow can produce a velocity model with better lateral resolution compared with conventional tomography, which can be crucial for addressing the long-standing fault shadow problem.

IB-RFWI extends FWI using Born modeling to generate synthetic data from reflectivity even with a smoothly varying initial velocity model and yields a low wavenumber velocity model update. Kinematics extraction or a data spectrum-matching process may be employed to mitigate undesirable differences between the synthetic and observed data (e.g., amplitude/spectrum difference and missing/extra events). Simple and realistic synthetic examples show that reliable low wavenumber velocity model update can be achieved.

FIG. 4 is a schematic diagram of a method 400 incorporating the previously described techniques according to an embodiment. Method 400 includes obtaining seismic data acquired using at least one source and sensors over a subsurface formation and an initial velocity model of the subsurface formation at 410. Method 400 then includes performing a true amplitude PSDM based on the initial velocity model to obtain images for the reflectivity model at 420, and performing Born modeling using the reflectivity model (either RMO-corrected images or stacked images) to generate synthetic data at 430. For example, FIG. 2 illustrates that RMO-corrected images work as an offset-dependent reflectivity model at 220; while FIG. 3 illustrates that stacked images work as an offset-independent reflectivity model at 320. Method 400 then includes applying reflection full waveform inversion to a difference between the seismic data and the synthetic data to update the initial velocity model at 440. The updated velocity model is usable to explore the presence of and/or to assist in extraction of natural resources from the subsurface formation.

The true amplitude PSDM may also yield common image gathers, CIGs, and the Born modeling then uses RMO corrected images based on the CIGs to generate the synthetic data.

Prior to calculating the difference between the seismic data and the synthetic data, a kinematic extraction may be performed in the data domain or in the image domain between the synthetic data and the seismic data to account for phase differences. Alternatively, prior to calculating the difference between the seismic data and the synthetic data, data matching is applied between the synthetic data and the seismic data.

Steps 420-440 may be performed iteratively using the velocity model as updated in one iteration as the initial model for a next iteration, until a predetermined criterion is met. The predetermined criterion may be a predetermined number of iterations, or achieving a stable velocity model; that is, an estimated difference between models in successive iterations becomes smaller than a predetermined threshold.

The effectiveness of IB-RFWI is validated by both simple and realistic synthetic data examples which show low wavenumber model updates and improvements of corresponding images. When the velocity model has been updated, the corresponding images used in the Born modeling are improved. Once the data residuals are small enough, the iterations are stopped, providing the final images.

Figure 5A:
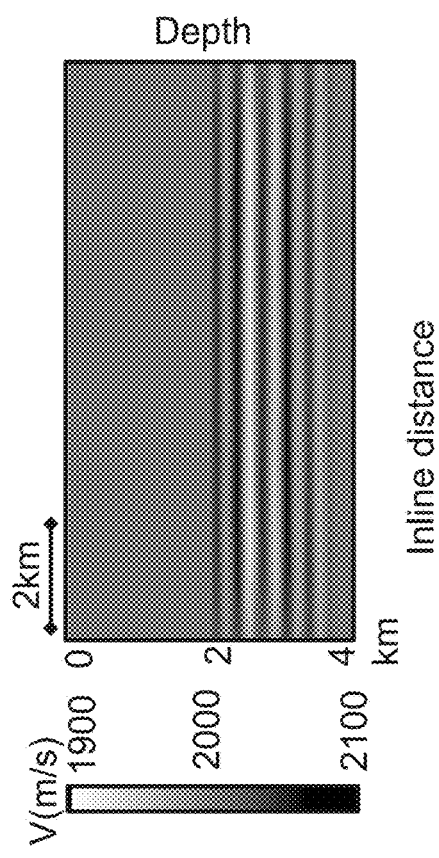
FIGS. 5A-5D illustrate a first test of IB-RFWI techniques.
Figure 5B:
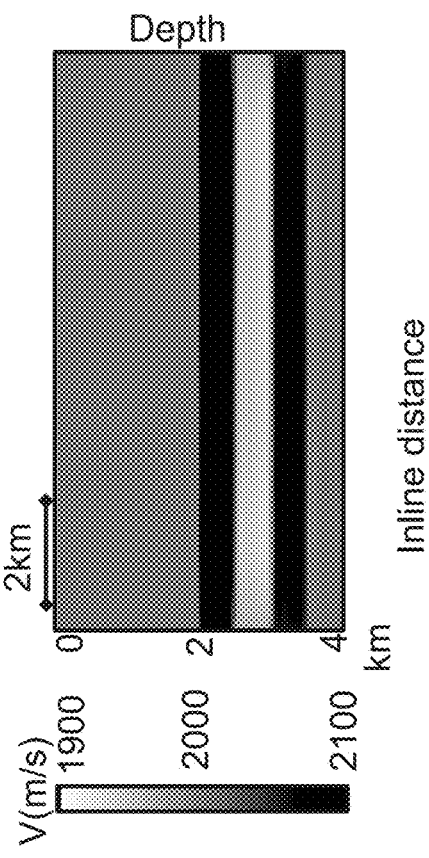
Figure 5C:
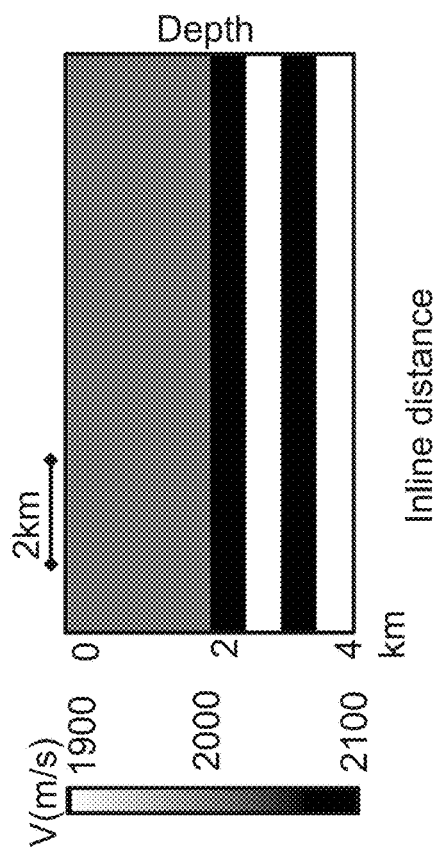
Figure 5D:
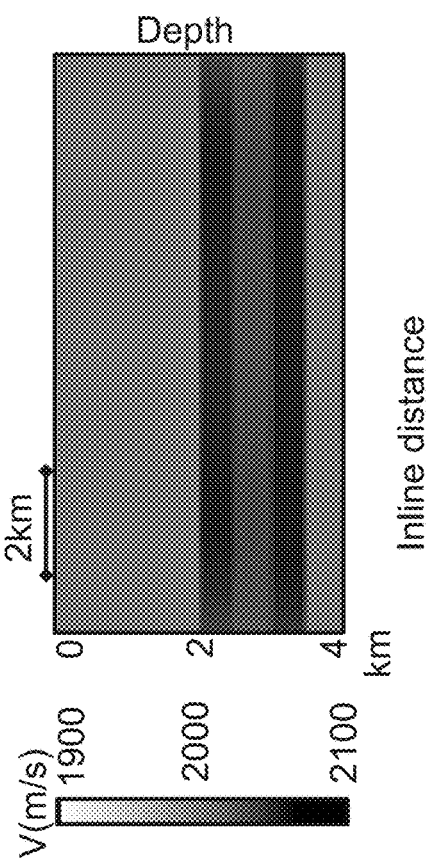

A first test of the IB-RFWI techniques tries to recover a two-dimensional cake velocity distribution illustrated in FIG. 5A, with positive and negative 100 m/s perturbations superimposed over a homogenous half space. The data is simulated with maximum offset of 5 km and only reflections smaller than critical angle are used for inversion. The initial model is the background constant velocity. The inversion was performed in a frequency band of 3-5 Hz. FIGS. 5B and 5C show the first iteration's gradient from conventional FWI and IB-RFWI, respectively. Comparing these two figures reveals there is only a migration term in conventional FWI since there is no contrast in initial velocity, while IB-RFWI gives a good background velocity update because Born modeling is introduced as one side wave propagation. Noticeably, there is no negative update at the third layer in the first IB-RFWI iteration, which is as expected, because there is no travel time error of the event at the bottom of the third layer after going through two perturbed layers (almost canceled out by positive and negative perturbation). In the following iterations, the negative update occurs since the shallower velocity is optimized, as shown in FIG. 5D, which represents the velocity model recovered after five IB-RFWI iterations. The last layer cannot be updated since there is no reflector at the bottom.

Figure 6B:
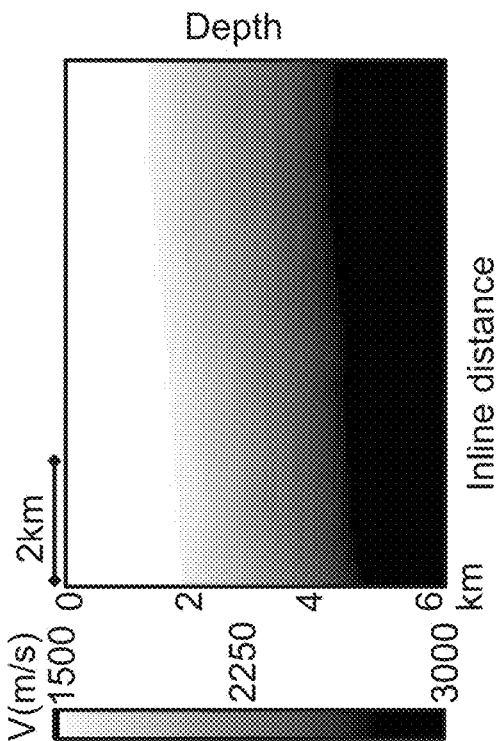
FIGS. 6A-6D illustrate a second test of IB-RFWI techniques.
Figure 6D:
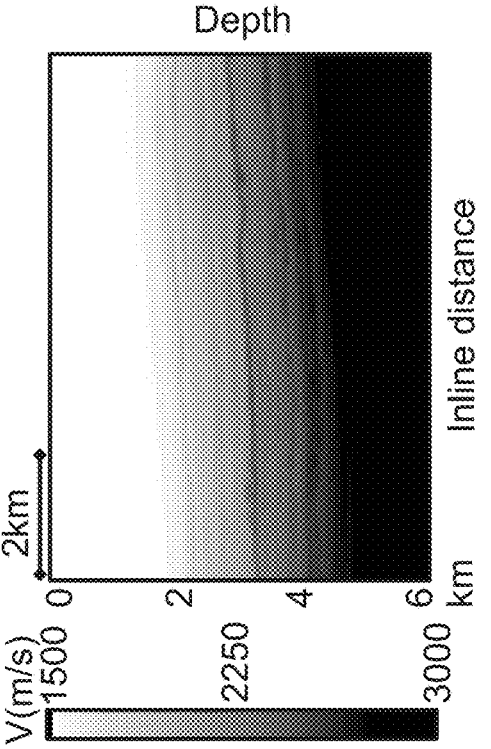
Figure 6A:
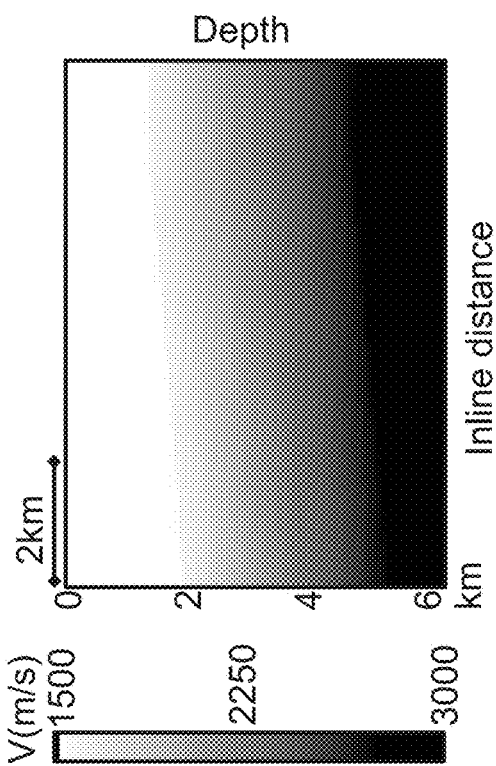
Figure 6C:
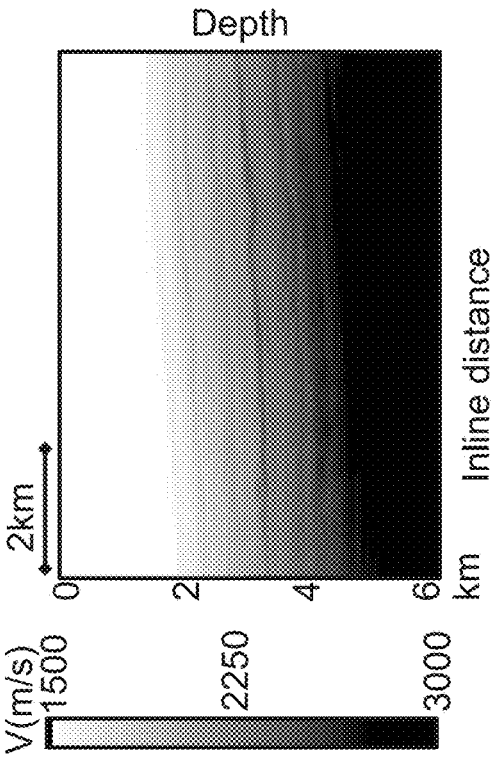

A second test of the IB-RFWI techniques tries to recover a more realistic two-dimensional true velocity distribution. The velocity distribution is recovered by using IB-RFWI to update the low-wavenumber velocity components followed by conventional FWI to update the high-wavenumber velocity components. IB-RFWI starts from the initial velocity model illustrated in FIG. 6A. This initial velocity model is a heavily smoothed one having low-wavenumber velocity difference from the true velocity distribution illustrated in FIG. 6D. The recovered low-wavenumber velocity distribution obtained via IB-RFWI illustrated in FIG. 6B is very close to the true velocity distribution. Conventional FWI then yields the inverted velocity distribution illustrated in FIG. 6C which includes both low- and high-wavenumber components showing the details of structures at the right depth.

A third test uses IB-RFWI techniques on Marmousi data that corresponds to complex fault structures. A 1 km water layer was added on the original Marmousi model to enable use of reflection data to yield a true velocity spatial distribution as illustrated in FIG. 7A. A maximum offset of 5 km is used for inversion.

Figure 7B:
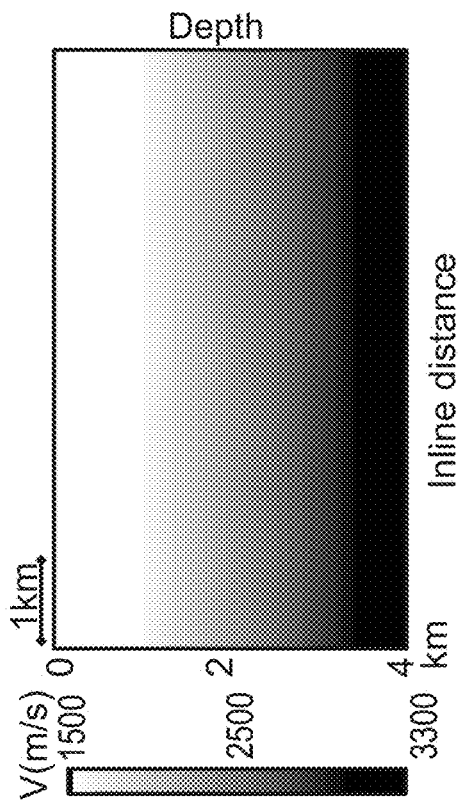
FIGS. 7A-7D illustrate a third test of IB-RFWI techniques.
Figure 7D:
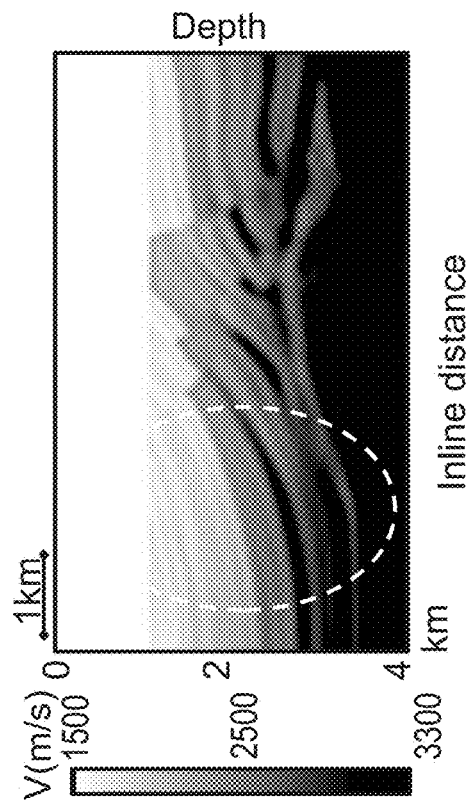
Figure 7A:
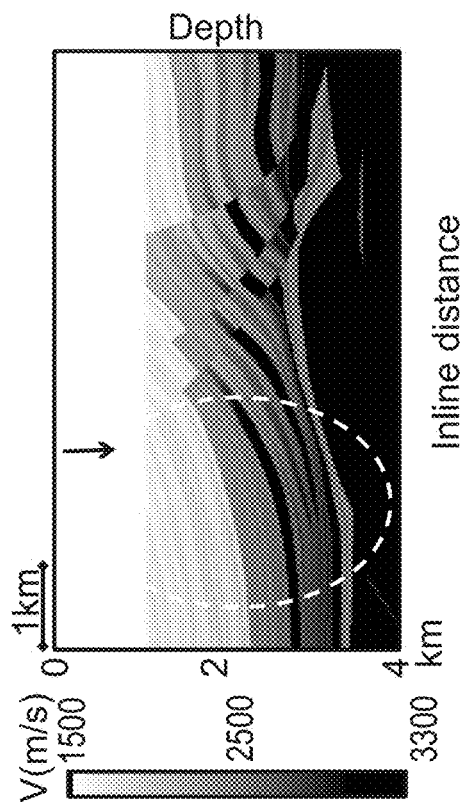
Figure 7C:
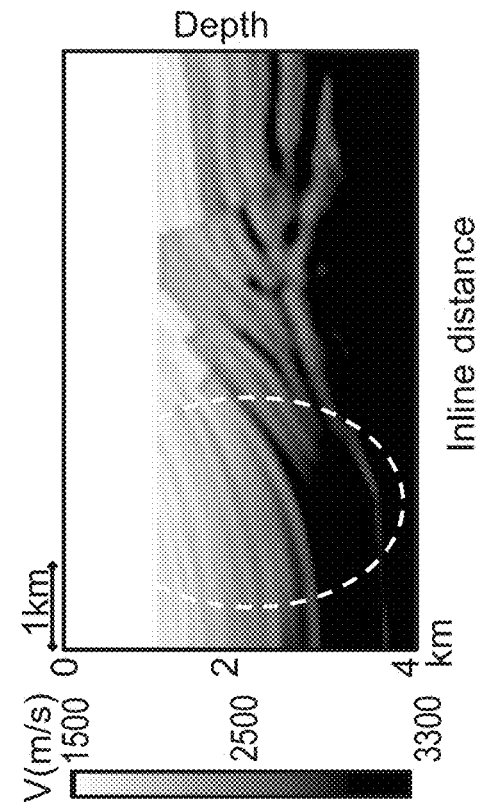

The initial velocity model used by IB-RFWI illustrated in FIG. 7B is a simple 1D velocity which has a substantively different trend compared with the true velocity distribution in FIG. 7A. FIG. 7C shows the recovered distribution obtained using only conventional FWI. The area indicated by a white oval in FIG. 7C is affected by a cycle-skipping problem because the initial velocity model is too far from the true velocity distribution. When IB-RFWI is used first to recover low-wavenumber velocity components before applying conventional FWI, the updated velocity model in FIG. 7D is much closer velocity to the true velocity distribution.

Figure 8:
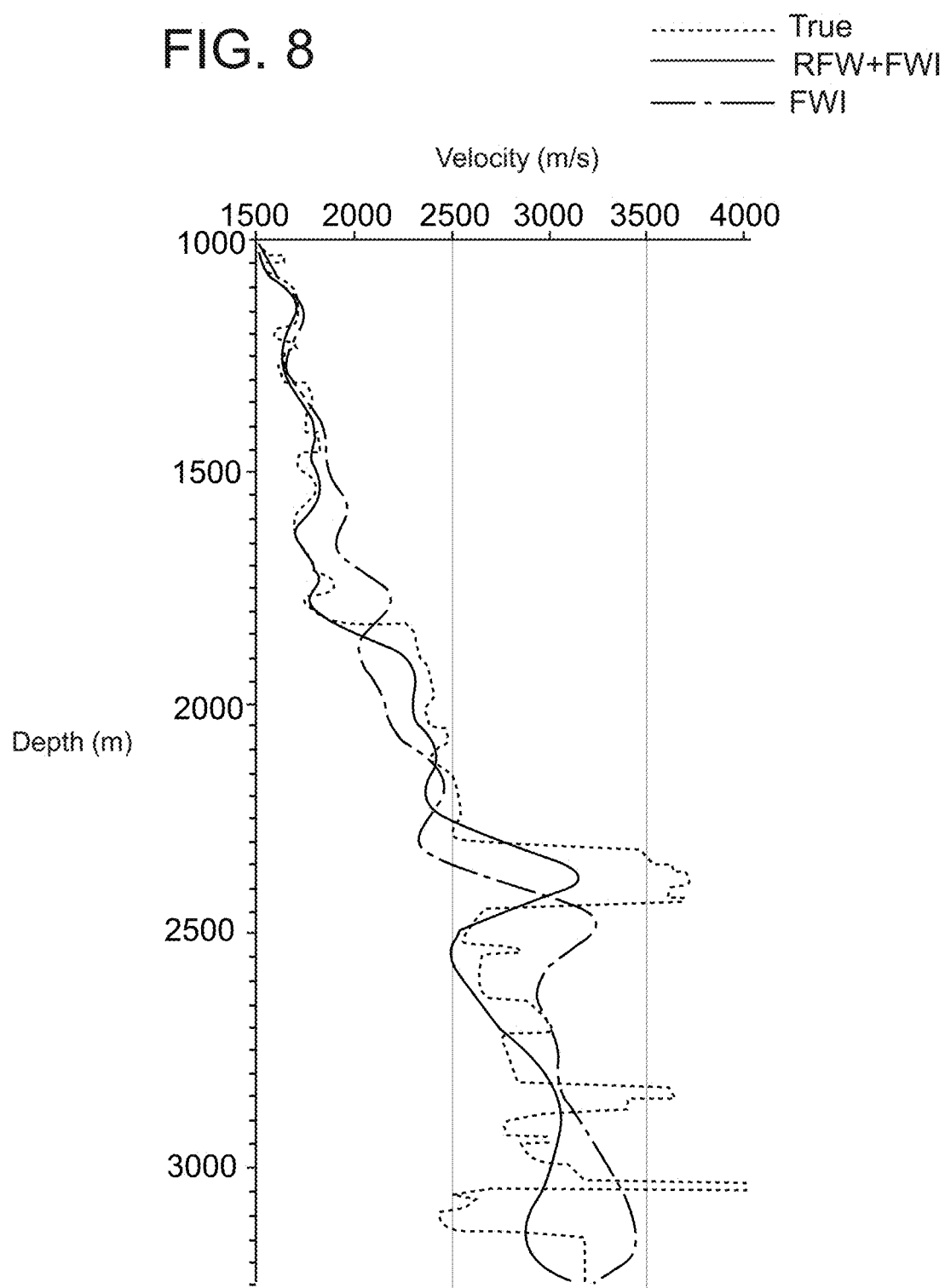
FIG. 8 is a graph comparing velocity profiles for the third test of IB-RFWI techniques.

FIG. 8 is a graph of velocity versus depth showing the velocity profile at the location indicated by arrow in FIG. 7A (and corresponding locations in FIGS. 7C and 7D). In contrast to the result 830 of applying only conventional FWI, the velocity 820 obtained by applying first RFWI and then conventional FWI 820 captures the major trends of the true velocity 810 and exhibits only some high-frequency difference, which has less impact on imaging.

Figure 9:
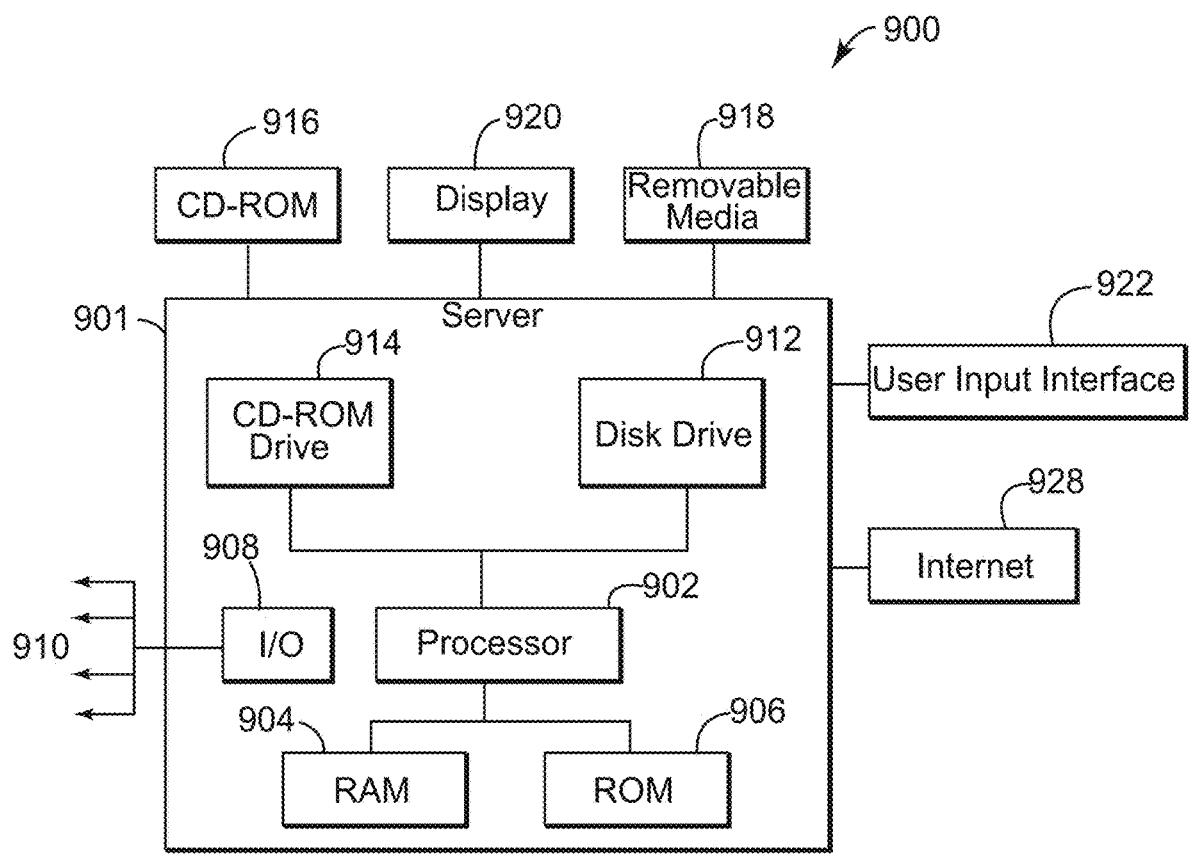
FIG. 9 is a block diagram of a seismic data processing device configured to perform methods according to various embodiments.

The above-discussed procedures and methods may be implemented in a seismic data processing device as illustrated in FIG. 9. Hardware, firmware, software or a combination thereof may be used to perform the various steps and operations described herein. Seismic data processing device 900 of FIG. 9 is an exemplary computing structure that may be used in connection with a seismic data acquisition system.

Exemplary seismic data processing device 900 suitable for performing the activities described in the exemplary embodiments may include a server 901. Such a server 901 may include a processor 902 coupled to a random-access memory (RAM) 904 and to a read-only memory (ROM) 906. Processor 902 may be configured as a central processing unit (CPU) and/or a graphics processing unit (GPU). ROM 906 may also be other types of storage media to store programs, such as programmable ROM (PROM), erasable PROM (EPROM), etc. Processor 902 may communicate with other internal and external components through input/output (I/O) circuitry 908 and bussing 910 to provide control signals and the like. The processor carries out a variety of functions as are known in the art, as dictated by software and/or firmware instructions.

Server 901 may also include one or more data storage devices, including hard drives 912, CD-ROM drives 914, and other hardware capable of reading and/or storing information, such as DVD, tape drive, etc. In one embodiment, software for carrying out the above-discussed steps may be stored and distributed on a CD-ROM or DVD, a USB storage device 918 or other form of media capable of portably storing information. These storage media may be inserted into, and read by, devices such as the CD-ROM drive 914, disk drive 912, tape drive, etc. Server 901 may be coupled to a display 920, which may be any type of known display or presentation screen, such as LCD, plasma display, cathode ray tube (CRT), etc. A user input interface 922 is provided, including one or more user interface mechanisms such as a mouse, keyboard, microphone, touchpad, touch screen, voice-recognition system, etc.

Server 901 may be coupled to other devices such as sources, detectors, etc. The server may be part of a larger network configuration as in a global area network (GAN) such as the internet 928, which allows ultimate connection to various landline and/or mobile computing devices.

The disclosed embodiments provide a method for configuring a dual/triple-source and a hexa-source to acquire two seismic datasets. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a general-purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A seismic exploration method comprising:
   obtaining seismic data acquired using at least one source and sensors over a subsurface formation and an initial velocity model of the subsurface formation;
   performing a true amplitude pre-stack depth migration, PDGM, based on the initial velocity model to obtain a reflectivity model;
   performing Born modeling using residual move-out, RMO, corrected images in the reflectivity model to generate synthetic data; and
   applying reflection full waveform inversion, RFWI, to a difference between the seismic data and the synthetic data to update the initial velocity model,
   wherein the updated velocity model is used to explore the presence of and/or assist extraction of natural resources from the subsurface formation.

2. The method of claim 1, wherein the true amplitude PSDM also yields common image gathers, CIGs, and the RMO corrected images are based on the CIGs.

3. The method of claim 1, wherein prior to calculating the difference between the seismic data and the synthetic data, a kinematic extraction is performed in the image domain between the synthetic data and the seismic data to account for phase differences.

4. The method of claim 1, wherein prior to calculating the difference between the seismic data and the synthetic data, a spectrum matching is applied between the synthetic data and the seismic data.

5. The method of claim 1, wherein the performing of the true amplitude PSDM, the performing of the Born modeling and the applying of the RFWI are performed iteratively using the initial velocity model as updated in an iteration as the initial model for a next iteration, until a predetermined criterion is met.

6. A seismic data processing apparatus comprising:
   an interface configured to obtain seismic data acquired over a subsurface formation and an initial velocity model of the subsurface formation; and
   a data processing unit connected to the interface and including at least one processor, the data processing unit being configured
   to perform a true amplitude pre-stack depth migration, PDSM, based on the initial velocity model to obtain a reflectivity model;
   to perform Born modeling using residual move-out, RMO, corrected images, in the reflectivity model to generate synthetic data; and
   to apply reflection full waveform inversion, RFWI, to a difference between the seismic data and the synthetic data to update the initial velocity model.

7. The seismic data processing apparatus of claim 6, wherein the true amplitude PSDM also yields the common image gathers, CIGs, and the RMO corrected images are based on the CIGs.

8. The seismic data processing apparatus of claim 6, wherein prior to calculating the difference between the seismic data and the synthetic data, the data processing unit performs a kinematic extraction in the image domain between the synthetic data and the seismic data to account for phase differences.

9. The seismic data processing apparatus of claim 6, wherein prior to calculating the difference between the seismic data and the synthetic data, the data processing unit performs spectrum matching between the synthetic data and the seismic data.

10. The seismic data processing apparatus of claim 6, wherein the data processing unit performs the true amplitude PSDM, the Born modeling and applies the RFWI iteratively using the initial velocity model as updated in an iteration as the initial model for a next iteration, until a predetermined criterion is met.

11. A non-transitory computer readable medium storing executable codes which, when executed on a computer make the computer perform a seismic exploration method comprising:
    obtaining seismic data acquired using at least one source and sensors over a subsurface formation and an initial velocity model of the subsurface formation;
    performing a true amplitude pre-stack depth migration, PDSM, based on the initial velocity model to obtain a reflectivity model;
    performing Born modeling using residual move-out, RMO, corrected images, in the reflectivity model to generate synthetic data; and
    applying reflection full waveform inversion, RFWI, to a difference between the seismic data and the synthetic data to update the initial velocity model,
    wherein the updated velocity model is used to explore presence and/or assist extraction of natural resources from the subsurface formation.

12. The non-transitory computer readable medium of claim 11, wherein the true amplitude PSDM also yields common image gathers, CIGs, and the RMO corrected images are based on the CIGs.

13. The non-transitory computer readable medium of claim 11, wherein prior to calculating the difference between the seismic data and the synthetic data, a kinematic extraction is performed in the image domain between the synthetic data and the seismic data to account for phase differences.

14. The non-transitory computer readable medium of claim 13, wherein the Born modelling is performed with image residuals obtained by subtracting the RMO corrected images from common image gathers.

15. The non-transitory computer readable medium of claim 11, wherein prior to calculating the difference between the seismic data and the synthetic data, a spectral matching is applied between the synthetic data and the seismic data.

16. The non-transitory computer readable medium of claim 11, wherein the performing of the true amplitude PSDM, the performing of the Born modeling and the applying of the -RFWI are performed iteratively using the initial velocity model as updated in an iteration as the initial model for a next iteration, until a predetermined criterion is met.

17. The method of claim 3, wherein the kinematic extraction is performed by dynamic warping or by local cross-correlation analysis to maximize a similarity between the synthetic data and the seismic data of the same offset.

18. The non-transitory computer readable medium of claim 13, wherein the kinematic extraction is performed by dynamic warping or by local cross-correlation analysis to maximize a similarity between the synthetic data and the seismic data of the same offset.

19. The seismic data processing apparatus of claim 8, wherein the kinematic extraction is performed by dynamic warping or by local cross-correlation analysis to maximize a similarity between the synthetic data and the seismic data of the same offset.

* * * * *